United States Patent [19]

Kodric

[11] Patent Number: 5,328,346
[45] Date of Patent: Jul. 12, 1994

[54] INJECTION MOLDING MACHINE

[76] Inventor: Joseph Kodric, 77 Frith Road, Downsview, Ontario, Canada, M3N 1G5

[21] Appl. No.: 960,605

[22] Filed: Oct. 8, 1992

[30] Foreign Application Priority Data

Oct. 8, 1991 [GB] United Kingdom ............... 9121309

[51] Int. Cl.⁵ .............................................. B29C 45/00
[52] U.S. Cl. ................................ 425/107; 100/258 A; 425/168; 425/589
[58] Field of Search ................ 100/46, 258 A; 264/40.5; 425/168, 589, 450.1, 451, 107

[56] References Cited

U.S. PATENT DOCUMENTS 2,358,686  9/1944  Caron ................................ 425/168
3,436,259  2/1976  Hofer et al. ....................... 425/168
4,174,199  11/1979  Benninghaus ...................... 425/168
4,948,358  8/1990  Kushibe et al. ................ 100/258 A Primary Examiner—Charles S. Bushey
Attorney, Agent, or Firm—Sim & McBurney

[57] ABSTRACT

A compensating device for an injection molding machine is provided which enables the moveable mold part to be supported on stationary platen guide rails of the molding machine, thereby relieving the bending force normally applied by the moveable mold part on the platen bearings and avoiding bearing wear. The compensating device is constructed to permit multiple directional adjustment, including vertical mold adjustment to permit existing bearing wear to be compensated for.

20 Claims, 7 Drawing Sheets

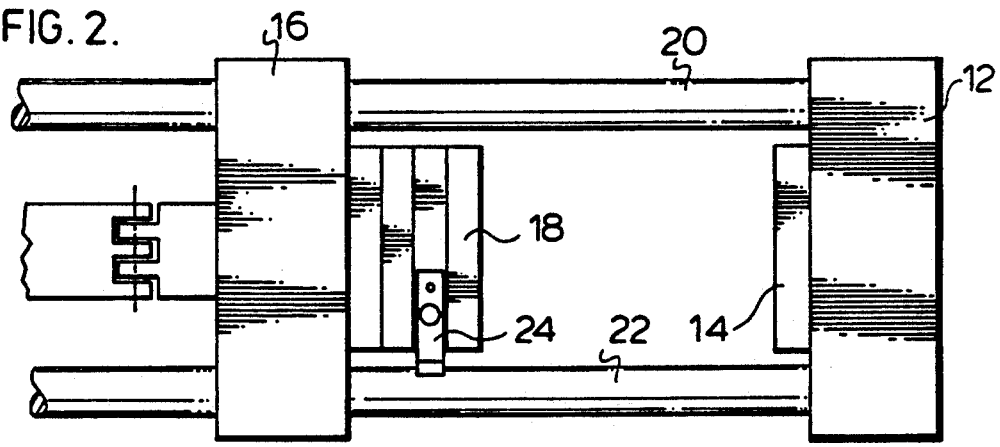
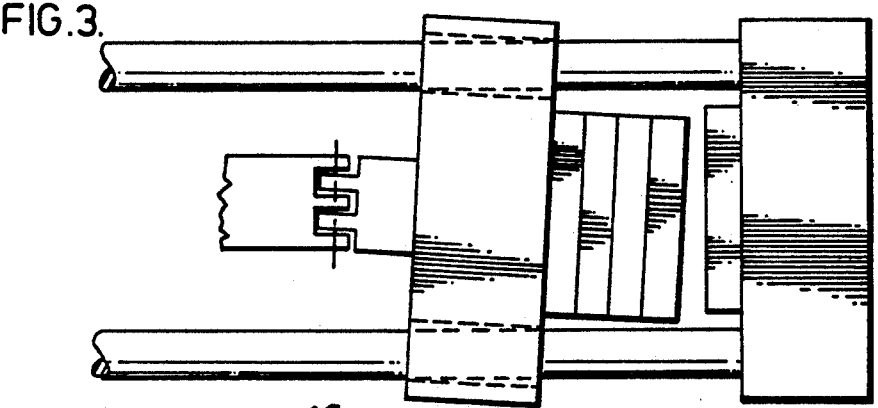
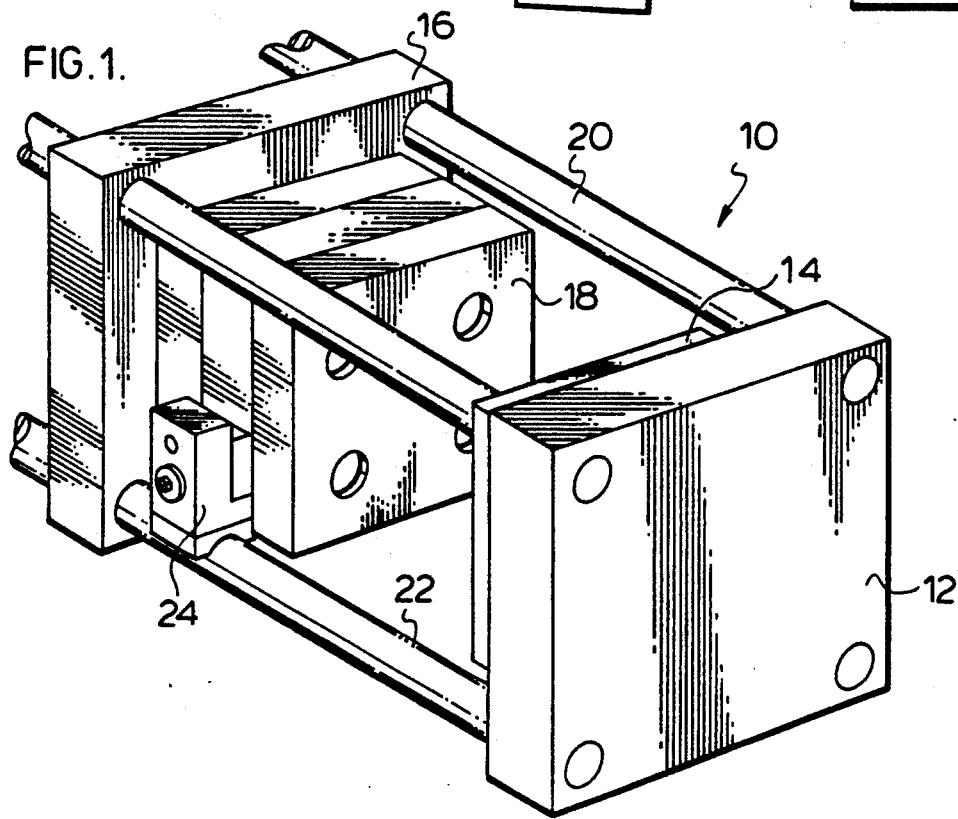

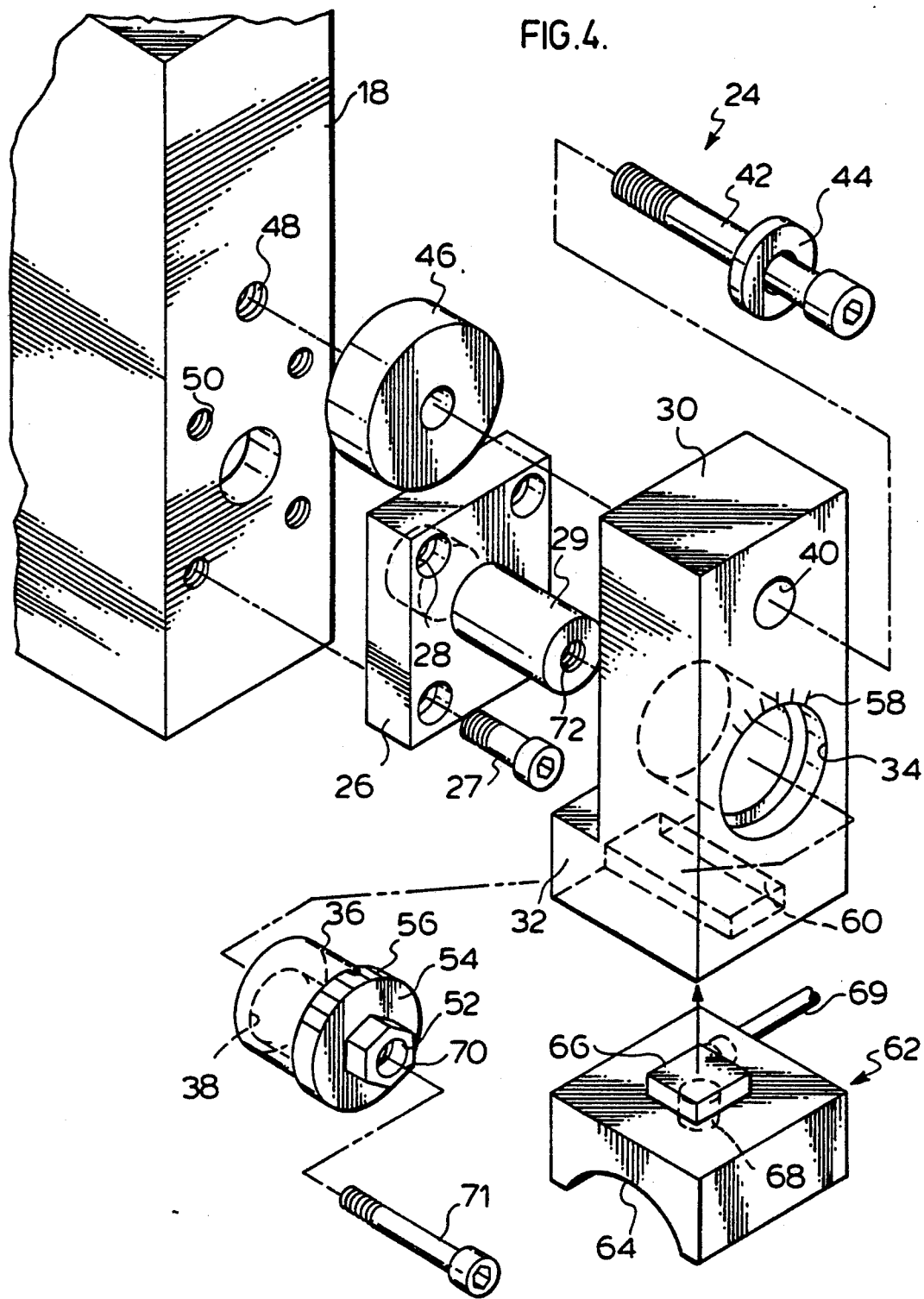

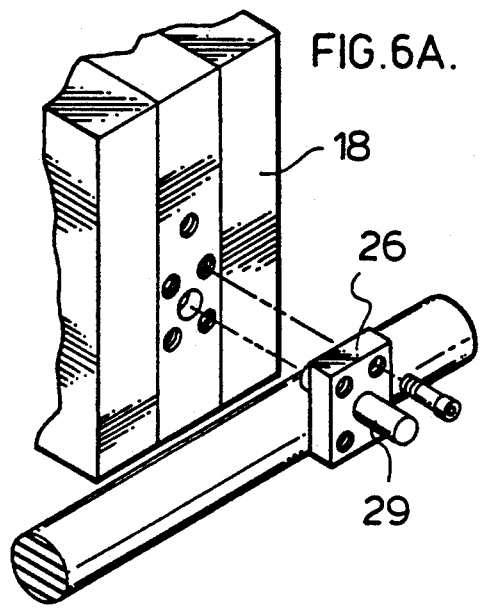 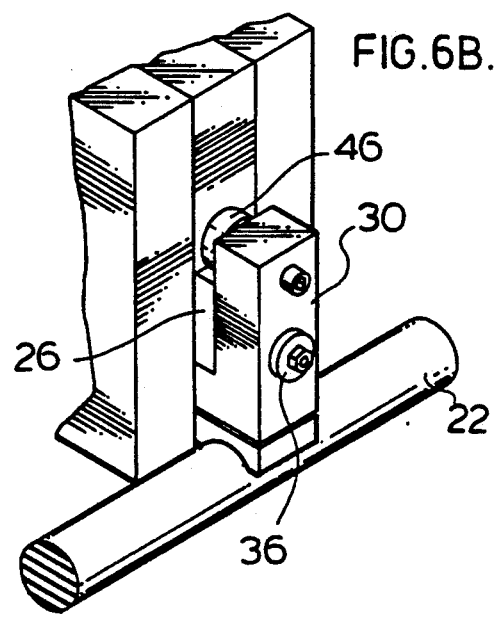 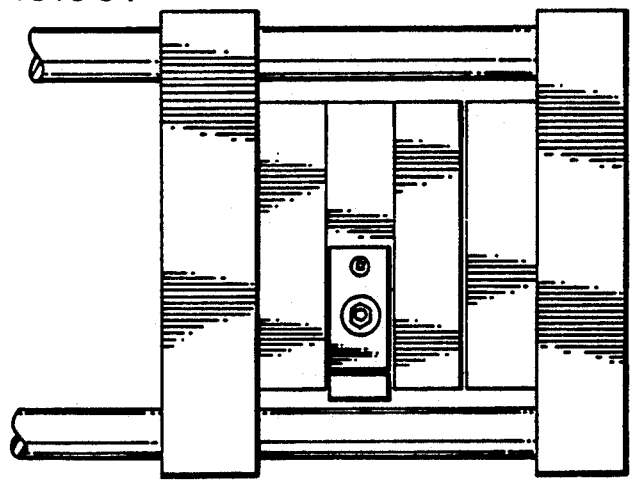 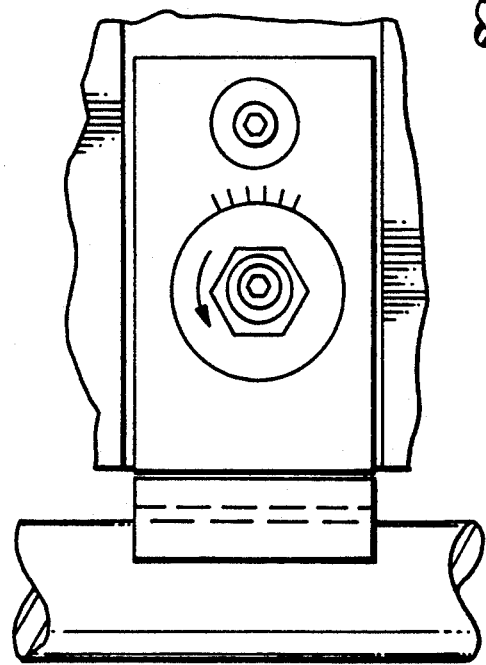 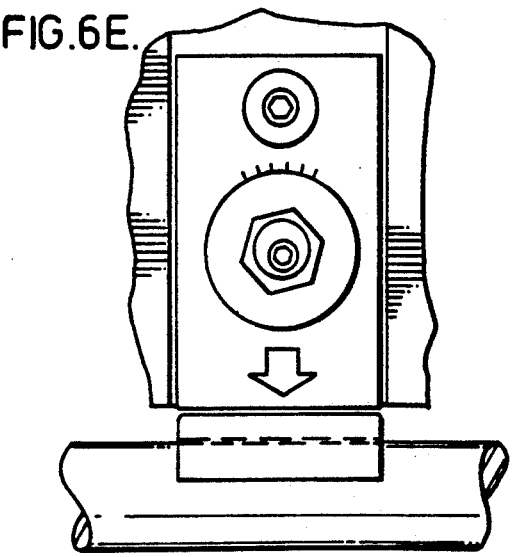

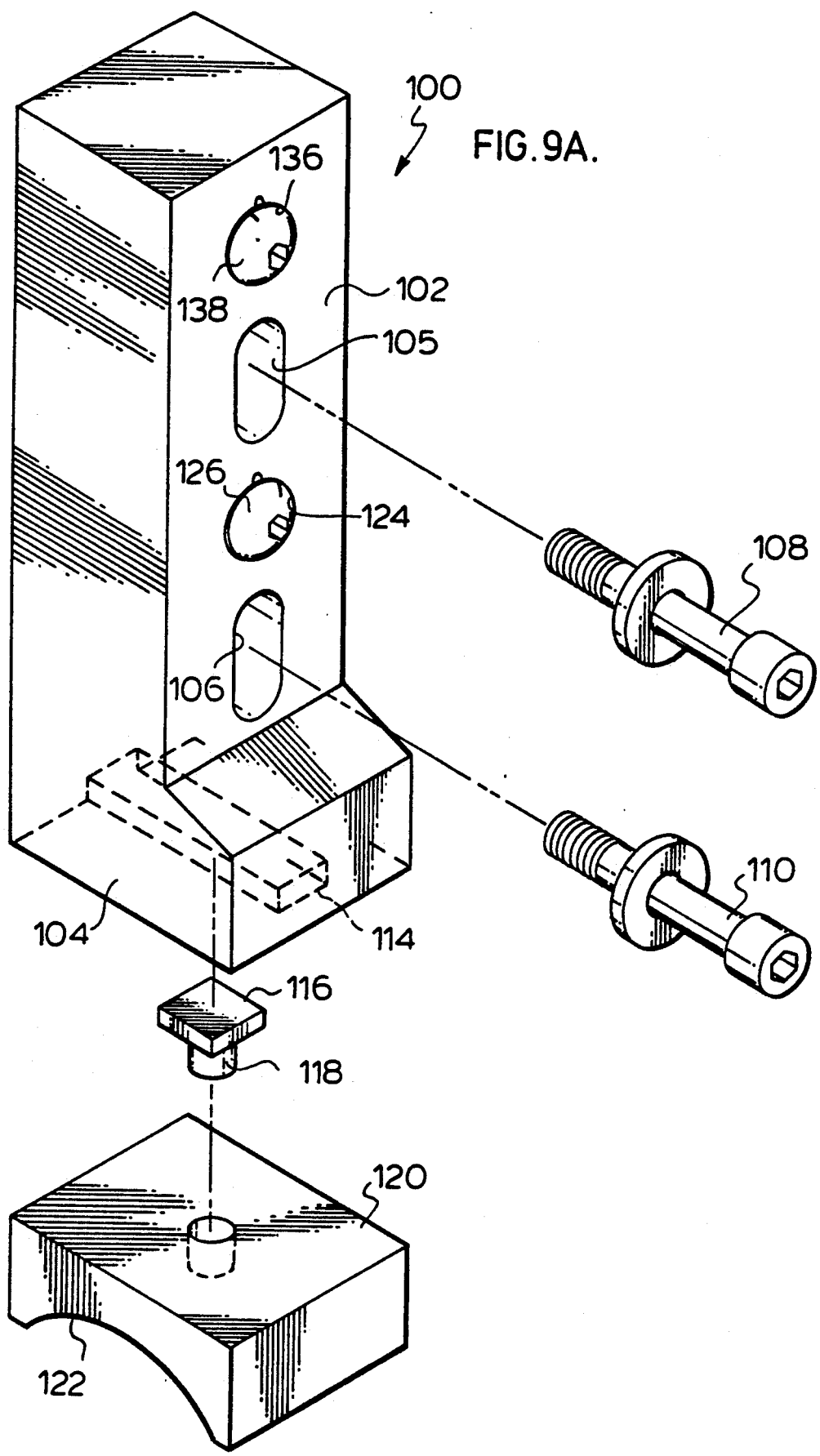

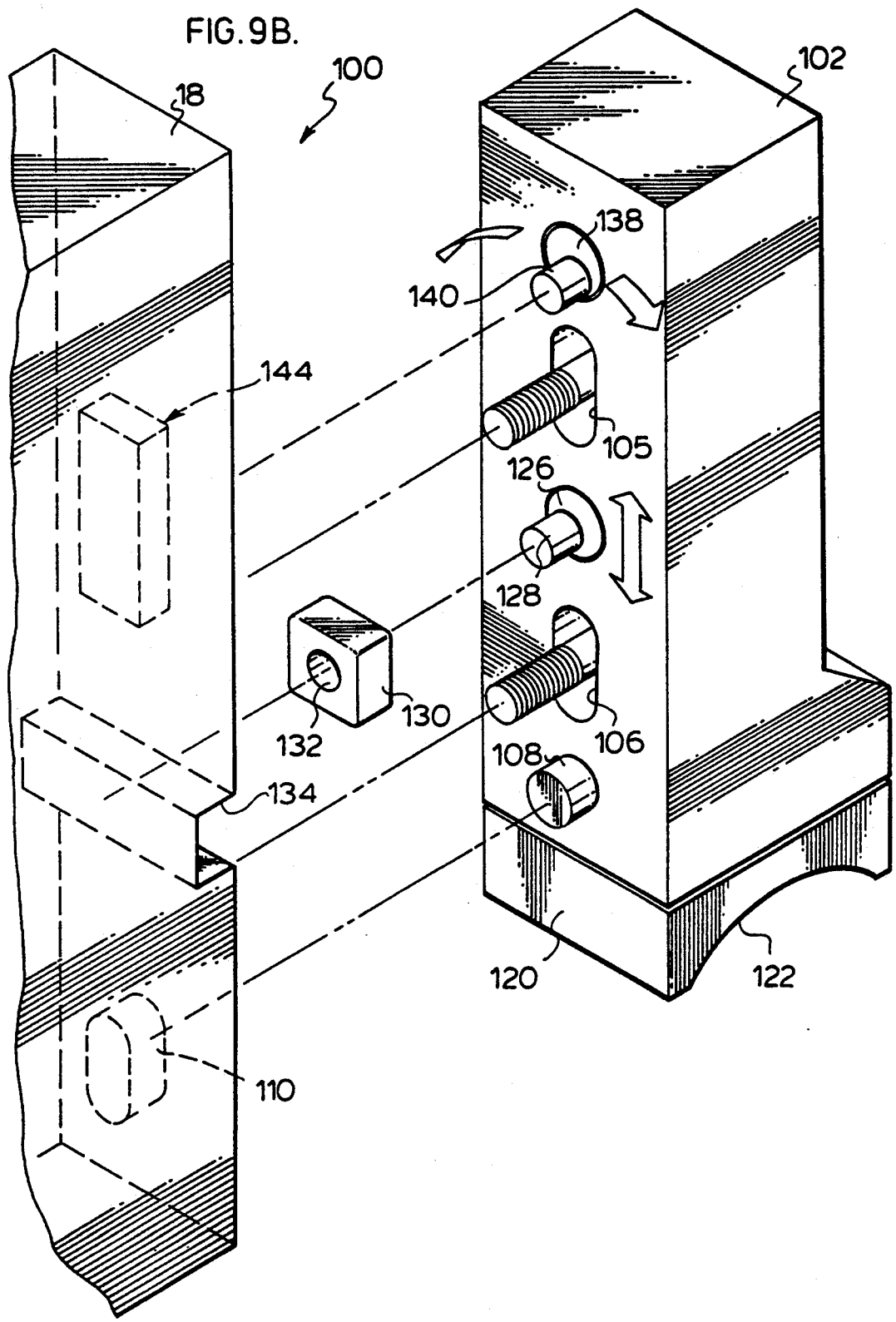

INJECTION MOLDING MACHINE

FIELD OF INVENTION

This invention relates to improvements in injection molding machines, particularly those designed to produce precision parts or draftless parts.

BACKGROUND TO THE INVENTION

In the molding of plastic parts by injection molding, mold parts are brought together to define a mold cavity, polymeric material is injected into the mold cavity and, after allowing time for the polymer to solidify, the mold parts are drawn apart and the molded part removed. The movable elements or platen of the molding machine are arranged to move in a horizontal direction and slide on stationary bars for this purpose to transport one of the mold parts into and out of mating relation with the other, stationary, mold part.

The weight of the mold part transported by the platen causes a bending force to be applied to the platen bearings, which produces wear on the bearings and, sometimes, difficulty in separating mold parts for removal of the molded article.

SUMMARY OF INVENTION

The present invention relates to a molding machine accessory which is able, effectively and precisely, to overcome this prior art problem.

The device of the present invention comprises means for compensating for the bending force produced by the moveable mold part, thereby relieving the stress on the platen bearings and ensuring that the mold parts can be readily and precisely separated following completion of the molding operation.

The device of the invention is mounted to both sides of the moveable mold part and rides on the existing platen guide bars for movement with the mold part towards and away from the injection molding position i.e. when mated with the stationary mold part. The device includes camming elements which permit the required compensation to be achieved.

Accordingly, in one aspect of the present invention, there is provided a device for use with an injection molding machine comprising a stationary mold part and a moveable mold part mounted on a platen for sliding movement on upper and lower horizontal rails into and out of mold cavity-forming relationship with the stationary mold part for compensating for the bending force on platen bearings produced by the moveable mold part. The device comprises a body member for mounting to the moveable body part, cam means mounted in the body member for applying a camming action to the moveable mold part when the body member is mounted to the moveable mold part, and a slide member mounted to the body member for mounting the body member in sliding relation to the lower horizontal rails.

In accordance with another aspect of the invention, there is provided an improvement in an injection molding machine which comprises a stationary mold part and a moveable mold part mounted on a platen for sliding movement on upper and lower horizontal rails into and out of mold cavity-forming relationship with the stationary mold part. The improvement comprises means mounted to the moveable mold part and received in sliding relationship to the lower horizontal rails for compensating for the bending force on platen bearings produced by the moveable mold part.

BRIEF DESCRIPTION OF DRAWINGS

FIG. 1 is a perspective view of a molding machine modified in accordance with one embodiment of the invention;

FIG. 2 is a side-elevational view of the molding machine of FIG. 1;

FIG. 3 is a side-elevational view of a molding-machine illustrating the effect of the absence of an adjusting device according to the invention;

FIG. 4 is an exploded view of one embodiment of compensating device provided in accordance with the invention;

FIGS. 6A to 6E show the steps of assembly of the compensating device of FIG. 4 with the molding machine and adjustment to the molding machine;

FIG. 9A and FIG. 9B contain perspective views from the front and from the rear of an alternative form of compensating device provided in accordance with another embodiment of the invention.

DESCRIPTION OF PREFERRED EMBODIMENT

Figure 5:
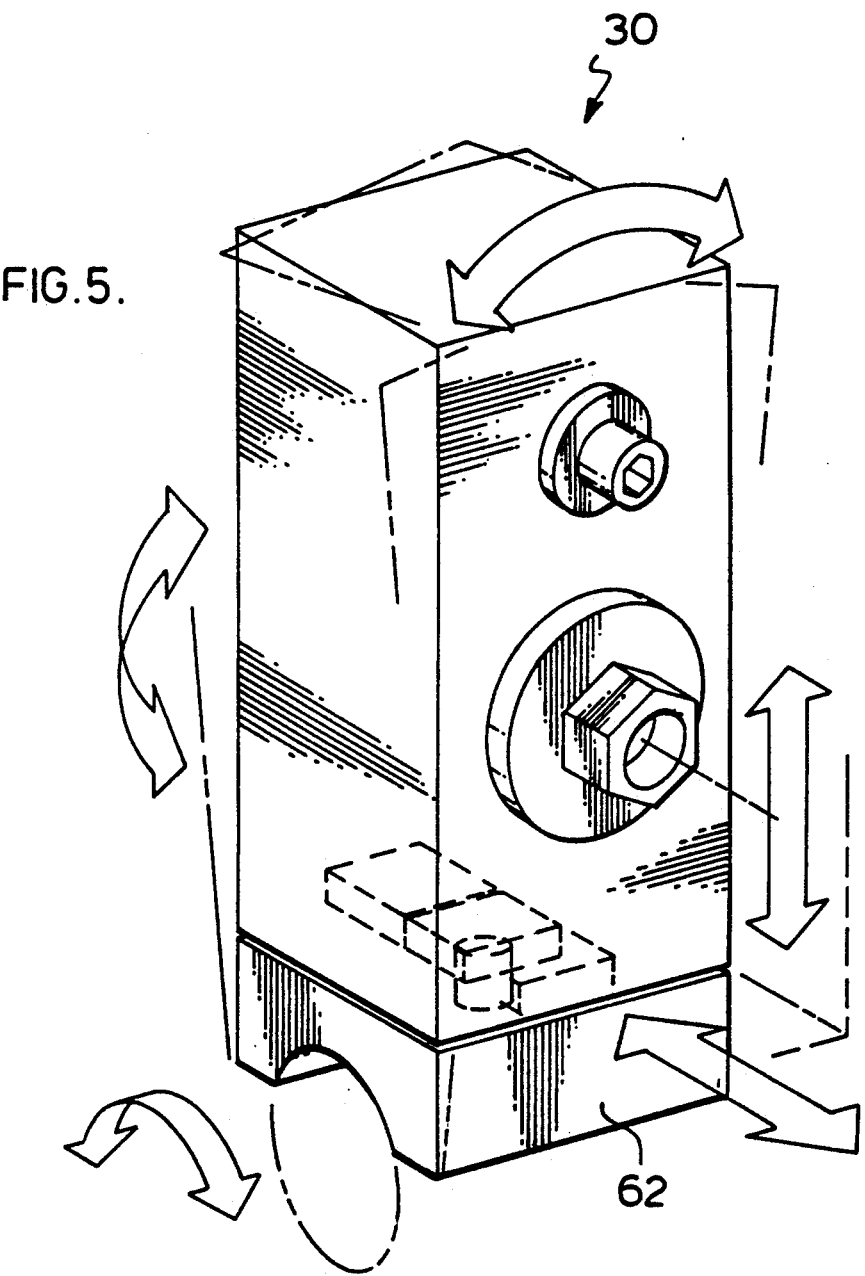
FIG. 5 is a perspective view of the compensating device of FIG. 4, illustrating the multi-axis adjustments of the device.

Referring first to FIGS. 1 to 8, there is shown therein a molding machine 10 of conventional structure comprising a stationary mold part support 12 to which a stationary mold part 14 is mounted. The molding machine further comprises a moveable mold part support or platen 16 on which a moveable mold part 18 is mounted. The moveable mold part 18 is moveable into mold-cavity forming relationship with the stationary mold part 14 for injection molding of plastic parts.

The moveable mold part support 16 is mounted for sliding movement on upper and lower stationary horizontal pairs of guide rails 20, 22, by means of suitable bearings. Having regard to the weight of the moveable mold part 18, there is a considerable pressure on the bearings in the moveable mold part support 16, which produces wear on these bearings, as seen schematically in FIG. 3. This wear can lead to bearings seizing up and improper alignment of the mold parts.

The invention provides a compensating device 24 which is mounted to the moveable mold part 18, at both sides, and which rides on the lower rails 22. The compensating or adjusting device supports the moveable mold part 18 on the lower rails 22 and is adjustable both to relieve the bending pressure on the bearings in the moveable platen 16 and to compensate for existing wear in the bearings.

A compensating or adjusting device 24 comprises a mounting plate 26, which is intended to be permanently fixed to the side wall of the moveable mold part 18 by bolts 27 received through openings 28. The mounting plate 26 has a cylindrical protrusion 29 extending from the face thereof. The device 24 has a main body member 30 comprising a generally cubic vertically-extending structure having an integral elongate foot element 32.

The main body member 30 has a first cylindrical bore 34 extending therethrough in which is received in sliding relation a rotor 36 which has an eccentricallyformed cylindrical bore 38 therein, which receives the cylindrical protrusion 29 in sliding fit relation.

The main body member 30 has an upper second cylindrical bore 40 therethrough. A mounting bolt 42 is received through the bore 40, which is of larger diameter than the bolt 42, and is affixed to the moveable mold part. A washer 44 may be mounted on the bolt 42 to overlie the bore 40. A spacer element 46 may be received on the bolt 42 to space the main body member 30 from the moveable mold part 18.

The moveable mold part 18 is provided with screw-threaded bores 48 and 50, the former serving a mounting bore for the mounting bolt 42 and the latter serving as mounting bores for bolts 27 received through openings in the mounting plate 26. Spacer elements also may be provided, depending on the size of the moveable mold part 18 to permit mounting of the compensating device to the moveable mold part.

The rotor 36 is provided with a nut 52 at the forward end to facilitate rotation of the rotor 36 by a wrench or similar tool. Alternatively, for larger mold sizes, a worm gear arrangement may be employed, seen in FIG. 7. The rotor 36 further comprises a flange element 54 which is provided with indicia 56 in its edge for alignment with indicia 58 formed on the face of the main body member 30 adjacent the bore 34. Such indicia provide a gauging device to determine when vertical alignment of mold parts has been achieved.

The foot member 32 has an elongate recess 60 formed therein which is open at the inner side of the body member 30. A shoe member 62 is provided with a curved lower surface 64 having a radius of curvature corresponding to that of the rails 22. The shoe member 62 has a mounting member 66 of square cross section and dimensioned to receive in sliding fit relationship to the recess 60. The mounting member 66 has a cylindrical protrusion 68 received in rotational relationship with a bore formed in the shoe member 62.

The curved surface 64 of the shoe member 62 may be provided with slots in the surface to provide for lubrication of the surface 64 and the surface of the rail 22 engaged by the shoe member 62. A bore may be provided through the mounting element 66 and protrusion 68 to provide a feed of lubricant from a source thereof via pipe 69 to the surface slots.

In operation, a compensating device 24 is provided on each side of the moveable mold part, riding on the respective lower rail 22. The mounting plate 26 is affixed to the moveable mold part 18. The shoe element 62 is placed on the rail 22 and the main body member 30 is seated on the shoe member by location of the mounting element 66 in sliding relation in the recess 60, with the bore 34 in approximate alignment with the cylindrical protrusion 29.

The rotor 36 then is located in the bore 34 and the cylindrical protrusion 29 is received in sliding fit relation with the eccentric bore 38. The rotor 36 may be rotated until hand-tight. The bolt 42 then is mounted to the moveable mold part 18 through the bore 40. With the mold parts together, the nut 52 is rotated to rotate the rotor 36 and effect a camming action on the moveable mold part 18 until the shoe member 62 locates automatically on the rail 22 in relation to the body member 30. Once the relative positions have been established, the compensating device 24 may be located in relative position to the moveable mold part by a suitable bolt 71 received through an opening 70 in the nut 52 into a threaded bore 72 provided in the protrusion 29.

As noted earlier, a worm gear arrangement may be used with heavier mold parts in place of the nut 52.

In this way, the required location of the moveable mold part 18 is established. The shoe member 62 rides on the side rails 22 during mold closing and opening so that the bending force normally borne by the platen bearings is borne by the compensating device 24 and the side rails 22. In this way, the life of the bearings is extended for a considerable time. The compensating device 24 may be adjusted to take into account existing bearing wear.

Figure 8A:
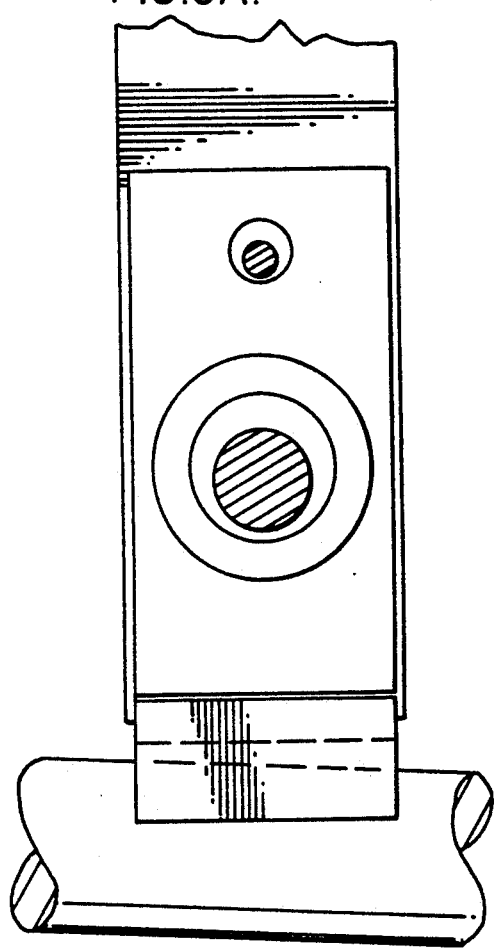
FIGS. 8A and 8B contain two side-elevational views illustrating operation of the camming device.
Figure 8B:
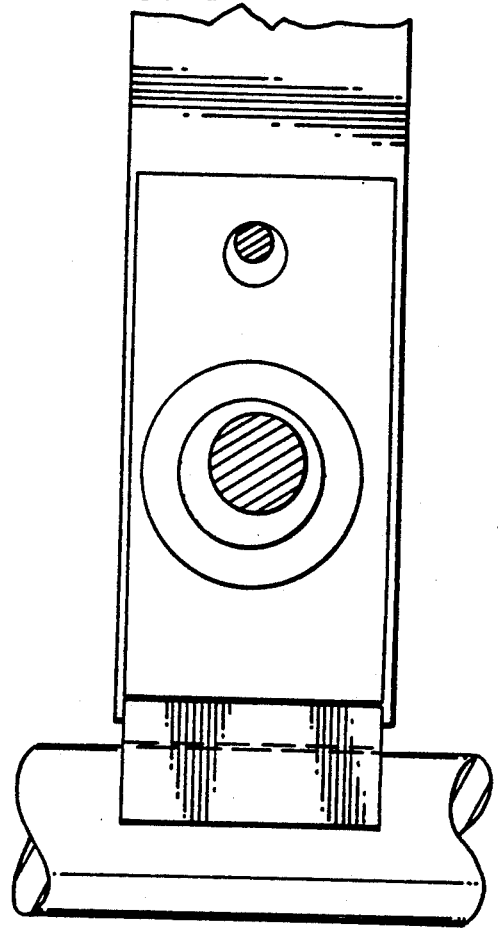
Figure 7:
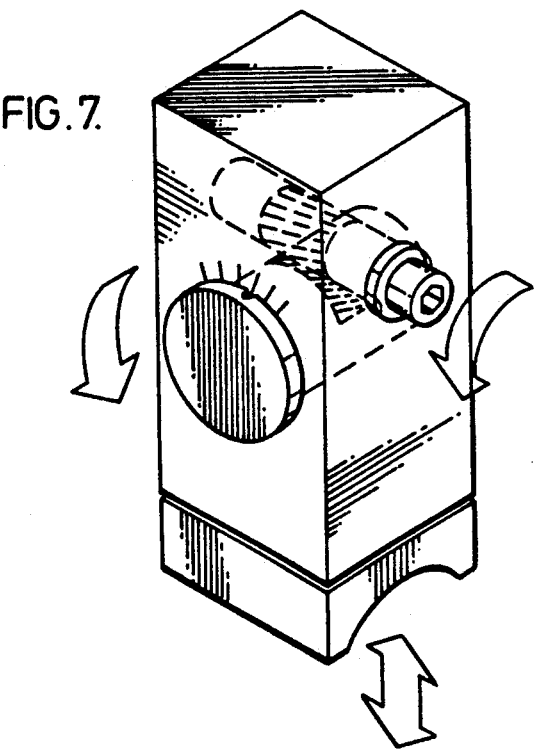
FIG. 7 is a perspective view of alternative form of device for applying rotational torque to the cam.

The compensating device 24 permits several adjustments to be made relative to the moveable mold part, as seen particularly from FIGS. 5 and 8. Rotation of the rotor 36 via nut 52 permits adjustment of the vertical position of the moveable mold part relative to the body member 30. The larger diameter of the bore 40 relative to the bolt 42 permits the body member 30 to effect lateral movement relative to the moveable mold part.

The sliding fit relationship of the mounting member 66 to the recess 60 permits the body member 30 to move inwardly or outwardly relative to the shoe member 62 to permit the device to be employed with molds which vary in width by minor amounts. Larger variations in mold width may be compensated for by appropriate adapter plates mounted to the mold and to which the mounting plate 26 is mounted.

The sliding fit relationship of the cylindrical protrusion 68 in the shoe member 62 permits rotational movement of the body member 30 relative to the shoe member about a vertical axis to permit minor angular adjustment of the body member 30 relative to the shoe member to ensure that the shoe member 62 sits correctly on the rail 22.

Finally, the sliding positioning of the shoe member 62 on the rail 22 permits adjustment of the positioning of the compensating device 24 relative to the curvature of the rail surface.

This flexibility of the device to provide for a variety of adjustments enables the device to function effectively as a support for the moveable mold part at all times while the device is able to freely slide on the side rails during mold opening and closing.

A further embodiment of compensating device is illustrated in FIGS. 9A and 9B. As seen therein, the compensating device 100, intended to be mounted to the moveable mold part 18, at both sides thereof and to ride on lower rail 22 comprises a generally cubic vertically-extending body member 102 having an elongate foot element 104. A first pair of openings 105, 106 is provided through the body member for receipt of mounting bolts 108, 110 therethrough for receipt in suitable bolt holes provided in the moveable mold part 18.

If the space between the side of the moveable mold part 18 and the body member 102 is insufficient for the body member 102 to be bolted directly to the mold part, then an adapter plate of suitable construction is provided of thickness sufficient to bridge the gap between the body member 102 and the side of the mold part 18.

The openings 105, 106 in the body member 102 are elongate in the vertical direction to permit movement of the mounting bolts 108, 110 relative to the body member 102, as described in detail below.

In addition, a mounting pin 108 protrudes from a rear face of body member 102 into a vertically elongate recess 110 in the mold part 18 or adapter plate, when the adapter plate is used, to act as a locator element during initial assembly and again to facilitate relative movement of the compensating device 100 and the moveable mold part 18.

The lower face of the body member 102 has a recess 114 which is elongate in the direction of the depth of the body member 102. A square head 116 of a joining element is received in the recess 114 for sliding movement therein while a round shank 118 of the joining element is received in a round recess formed in the upper surface of a slide or shoe element 120. The lower surface 122 of the slide element 120 is curved to the radius of curvature of the platen guide bars 22, so as to be received thereon and supported thereby. Lubrication of the surface 122 may be provided, as described above for the embodiment of FIGS. 1 to 8.

The elongate character of the recess 114 permits the body member 102 to move towards or away from the mold part 18 for secure mounting thereto, with or without the use of the adapter plate 22, so as to effect a self-adjustment of the position of the body member 102 in this direction relative to the mold part 18.

The body member 102 has a cylindrical bore 124 therethrough in which is mounted a first cam bearing 126, which has an eccentric shaft 128 extending from the rear end thereof. A cam bearing 130 of square outline has a round recess 132 for receipt of the eccentric shaft 128 therein. The cam bearing 130 is positioned in a laterally-extending recess 134 in the mold part 18 and dimensioned to receive the cam bearing 132 in sliding fit therein.

The body member 102 has a further cylindrical bore 136 therethrough in which is mounted a second cam bearing 138, which has an eccentric shaft 140 extending from the rear end thereof. The eccentric shaft 140 is received in a vertically elongate recess 144 in the mold part 18.

Assembly of the various elements described above and mounting two units of compensating device to the moveable mold part 18 results in the body member 102 being mounted in sliding relation to the platen guide bars 22 by the slide element 120. The platen guide bars 22 act as load support elements for the moveable mold part 18. By reason of the cam bearing 126 and the eccentric shaft 128 thereof being received in the recess 134 in the mold part 18 via bearing 130, rotation of the cam bearing 128 effects a corresponding movement in the mold part 18, enabling adjustment to a vertical position of the mold part 18 relative to the side rails 22 to be effected, thereby compensating for the bending movement and wear on the platen bearings experienced in the prior art, and enabling mold opening to be effected easily and efficiently. A suitable gauging device may be used to determine when vertical alignment has been achieved.

The reciprocal movement of the sliding element 120 on the platen guide rails 22 will lead to wear of the sliding element 120. To compensate for such wear, the second cam bearing 136 is employed to adjust the physical height of the body member 102 relative to the moveable mold part 18, as and when such adjustment is required.

The compensation device of the invention, therefore, avoids the prior art problems arising from the tendency for the moveable mold part to bend by, in effect, supporting the moveable mold part on the platen guide arms from both sides.

SUMMARY OF DISCLOSURE

In summary of this invention, the present invention provides a novel device useful in injection molding machines to effect compensation for the tendency of moveable mold parts to bend relative to the molding machine and result in wear of bearings and difficulty in opening mold parts. Modifications are possible within the scope of this invention.

What I claim is:

1. A device for use with an injection molding machine comprising a stationary mold part and a moveable mold part mounted on a platen for sliding movement on upper and lower horizontal rails into and out of mold cavity-forming relationship with said stationary mold part for compensating for a bending force on platen bearings produced by the moveable mold part, which comprises:
    a body member for mounting to the moveable mold part,
    cam means mounted in said body member for applying a camming action to the moveable mold part when the body member is mounted to the moveable mold part, and
    a slide member mounted to said body member for mounting said body member in sliding relation to the lower horizontal rails.

2. The device of claim 1 wherein said body member is vertically elongate and said cam means comprises a first horizontal bore therethrough and a rotor received in sliding fit relationship with said first horizontal bore.

3. The device of claim 2 wherein said rotor has an internal eccentric bore which receives in sliding fit therewith a shaft adapted for mounting to the moveable mold part.

4. The device of claim 3 wherein said rotor has a nut at one end for applying torque to the rotor.

5. The device of claim 4 wherein said cam means includes means to releasably lock relative positions of said rotor and said shaft.

6. The device of claim 2 wherein said rotor has a shaft extending from one end thereof eccentric with respect to the axis of the rotor for receipt in camming relation to a vertically extending slot formed in the moveable mold part.

7. The device of claim 2 wherein said slide member has a curved lower surface having a radius of curvature corresponding to that of the lower horizontal rails.

8. The device of claim 7 wherein said body member has a recess in a lower face thereof extending in the same direction as said first horizontal bore, and slide member mounting means mounts said slide member in sliding relation to the lower face recess to permit movement of said body member transverse to the lower horizontal rails and towards and away from the moveable mold part.

9. The device of claim 8 wherein said slide member mounting means is arranged to permit movement of said slide member about a vertical axis when mounted in the lower face recess to permit swivel movement of said body member relative to said slide member.

10. The device of claim 9 wherein said body member has a second horizontal bore therethrough parallel to said first bore for receiving a securing bolt therein adapted to be connected to the moveable mold part.

11. In an injection molding machine which comprises a stationary mold part and a moveable mold part mounted on a platen for sliding movement on upper and lower horizontal rails into and out of mold cavity-forming relationship with said stationary mold part, the improvement which comprises:

means mounted to said moveable mold part and received in sliding relationship to said lower horizontal rails for compensating for a bending force on platen bearings produced by said moveable mold part.

12. The molding machine of claim 11 wherein said compensating means comprises a body element mounted to said moveable mold part, a slide element located in sliding relationship to said lower horizontal rails, cam means mounted to said body element and operatively connected to said moveable mold part to effect a camming action on the moveable mold part and effect movement of the moveable mold part vertically with respect to the body element, and means connecting said body element and said slide element.

13. The molding machine of claim 12 wherein said means connecting said body element and said slide element is constructed to permit both sliding movement of said body element relative to said slide element in a direction generally transverse to the axis of said lower horizontal rails and rotational movement of said body element relative to said slide element about a vertical axis of said body element.

14. The molding machine of claim 13 including means for lubricating a surface of said slide element engaging said lower horizontal rails.

15. The molding machine of claim 13 wherein said cam means comprises a rotor element received in sliding fit relationship with a first horizontal bore formed through said body member transverse to the axis of said lower horizontal rails, an eccentrically-arranged cylindrical bore formed in said rotor, and a shaft mounted in fixed relation to said moveable mold part and received in sliding fit relation with said eccentrically-arranged cylindrical bore, whereby rotation of said rotor causes said moveable mold part to move vertically in relation to said body member.

16. The molding machine of claim 15 wherein said rotor element has means for applying torque thereto to effect rotation thereof.

17. The molding machine of claim 16 wherein said rotor element has integral flange means located in abutting relationship with an outer face of said body element at an upstream end of said first horizontal bore and said torque applying means is mounted to said flange.

18. The molding machine of claim 17 including means for releasably locking said rotor and said shaft relative to one another.

19. The molding machine of claim 17 wherein said body element has a second horizontal bore formed therethrough parallel to said first horizontal bore and receiving a bolt therethrough having a diameter less than that of said second horizontal bore and fixedly mounted to said moveable mold part.

20. The molding machine of claim 19 wherein said shaft is fixedly located in a mounting plate mounted to said moveable mold part.

* * * * *